(12) United States Patent
Duez et al.

(10) Patent No.: US 11,034,236 B2
(45) Date of Patent: Jun. 15, 2021

(54) FUEL TANK COMPOSITION

(71) Applicant: Plastic Omnium Advanced Innovation and Research, Brussels (BE)

(72) Inventors: Laurent Duez, Uccle (BE); Pierre De Keyzer, Brussels (BE)

(73) Assignee: Plastic Omnium Advanced Innovation and Research, Brussels (BE)

( * ) Notice: Subject to any disclaimer, the term of this patent is extended or adjusted under 35 U.S.C. 154(b) by 204 days.

(21) Appl. No.: 16/317,367

(22) PCT Filed: Jul. 27, 2017

(86) PCT No.: PCT/EP2017/069070
§ 371 (c)(1),
(2) Date: Jan. 11, 2019

(87) PCT Pub. No.: WO2018/019956
PCT Pub. Date: Feb. 1, 2018

(65) Prior Publication Data
US 2019/0315225 A1    Oct. 17, 2019

(30) Foreign Application Priority Data
Jul. 27, 2016 (EP) .................................. 16305973

(51) Int. Cl.
*B60K 15/03* (2006.01)
*B29C 65/00* (2006.01)
(Continued)

(52) U.S. Cl.
CPC ........ *B60K 15/03177* (2013.01); *B29C 66/54* (2013.01); *B29C 66/71* (2013.01);
(Continued)

(58) Field of Classification Search
CPC .... B60K 15/03177; B60K 2015/03493; B60K 2015/03059; B29K 2077/10; C08L 77/02; C08L 77/06; B29C 66/54; B29C 66/71
See application file for complete search history.

(56) References Cited

U.S. PATENT DOCUMENTS 7,771,805 B1 * 8/2010 Negandhi ........... B29C 49/0005
428/35.7
2009/0203845 A1 * 8/2009 Fukui .................... B29C 45/006
525/190

(Continued)

FOREIGN PATENT DOCUMENTS

CN        101528854        9/2009
CN        104395059        3/2015
(Continued)

OTHER PUBLICATIONS

International Search Report dated Oct. 26, 2017 in PCT/EP2017/069070 filed Jul. 27, 2017.

*Primary Examiner* — Stephen J Castellano
(74) *Attorney, Agent, or Firm* — Oblon, McClelland, Maier & Neustadt, L.L.P.

(57) ABSTRACT

The present invention proposes a fuel tank comprising at least two shells weldable together, each of said at least two shells is made of a polymer composition comprising at least 45% by weight of at least one aromatic polyamide and at least 10% by weight of at least one aliphatic polyamide relative to the total weight of the polymer composition.

9 Claims, 5 Drawing Sheets

(51) Int. Cl.
*C08L 77/02* (2006.01)
*C08L 77/06* (2006.01)
*B29C 45/00* (2006.01)
*B29K 77/00* (2006.01)
*B29L 31/00* (2006.01)

(52) U.S. Cl.
CPC .............. *C08L 77/02* (2013.01); *C08L 77/06* (2013.01); *B29C 45/0001* (2013.01); *B29K 2077/10* (2013.01); *B29L 2031/7172* (2013.01); *B60K 2015/03059* (2013.01); *B60K 2015/03493* (2013.01)

(56) References Cited

U.S. PATENT DOCUMENTS

| | | |
|---|---|---|
| 2010/0004406 A1 | 1/2010 | Sato |
| 2011/0014486 A1* | 1/2011 | Sakamoto .............. B29C 66/71 428/474.4 |
| 2014/0023808 A1* | 1/2014 | Bzducha .............. B29D 22/003 428/35.7 |
| 2015/0183155 A1 | 7/2015 | Saito |
| 2017/0342269 A1 | 11/2017 | Kikuchi et al. |
| 2019/0242525 A1* | 8/2019 | Criel ....................... B32B 27/08 |

FOREIGN PATENT DOCUMENTS

| | | |
|---|---|---|
| CN | 107109052 | 8/2017 |
| JP | 2005-7615 A | 1/2005 |
| JP | 2005-298639 A | 10/2005 |
| WO | WO2007/046541 | 4/2007 |

* cited by examiner

FUEL TANK COMPOSITION

This application is the national stage (Rule 371) of international application No. PCT/EP2017/069070 filed Jul. 27, 2017.

FIELD OF THE INVENTION

The field of the invention relates to fuel tanks for a motor vehicle. In particular, the invention relates to a fuel tank having at least two shells which are manufactured from a polymer composition, by injection molding.

BACKGROUND

Fuel tanks are frequently used in today's motor vehicles and are therefore known.

Generally, the fuel tank is composed of a plurality of shell parts which are manufactured by molding and are then welded to one another, such as the two half shells forming the tank, or the fuel tank is manufactured by blow molding.

Injection molding and welding is an alternative showing several advantages especially reduced weight.

Thus, the polymer composition of shell parts of the fuel tank has to have good welding performance.

In addition, such fuel tanks require to exhibit high safety performance, particularly with regard to chemical and mechanical properties.

By "chemical properties", it has to be understood fuel permeability, fuel resistance, high temperature resistance and UV light resistance.

By "mechanical properties", it has to be understood impact/burst resistance, heat/fire resistance, creep and fatigue resistance.

Aromatic polyamide, such as polyphthalamide (PPA), due to its aromatic nature provides with benefits such as low fuel permeability and mechanical properties as compared to other polymers or polyamides. Thus, aromatic polyamide composition is commonly used in the automotive industry.

Glass fibers are generally used to improved tensile modulus and so to enhance the creep resistance. However, it has been observed that the incorporation of fibers (such as glass, carbon, etc.) in aromatic polyamide decrease impact resistance compared to unfilled aromatic polyamide.

To meet safety regulation, modifying agents are dispersed in aromatic polyamide composition.

The main drawback of the use of unfilled aromatic polyamide composition with modifying agents is its low welding performance with particle-free processes (e.g. clean welding processes), which makes difficult the assembly of shell parts such as the two half tank shells.

JP 2005-007615 is reporting a fuel tank for an automobile comprising a resin composition containing 95-60% of an aromatic polyamide.

JP 2005-298639 is relating to polyamide compositions useful for forming various components associated with fuel tanks such as valves. Such components are comprising at least two portions of different compositions; one of the portion is a polyolefin resin portion, which should bond to the other polyamide resin-containing portion.

US 2014/023808 is disclosing polyamide compositions containing impact resistance modifying agents; the polyamide composition could comprise 20 to 90% of aromatic polyamides such as PA 6.6T.

SUMMARY

An object of the present invention is to solve the above-mentioned problem by proposing a fuel tank comprising a polymer composition having an excellent balance of properties such as fuel permeability, mechanical properties and welding performance.

It is therefore one aspect of the present invention to provide a fuel tank comprising at least two shells weldable together, each of said at least two shells is made of a polymer composition comprising at least 45% by weight of at least one aromatic polyamide and at least 10% by weight of at least one aliphatic polyamide relative to the total weight of the polymer composition, the maximum content of aromatic group-containing repeating units in an aliphatic polyamide being 0 mol % based on 100 mol % repeating units in the polymer.

Another aspect of the invention concerns a vehicle containing such a fuel tank.

In the present document, the term "at least one" means one or more and thus includes individual components as well as mixtures/combinations.

The term "polymer composition" refers to a polymeric material having one or more monomer species, including homopolymers, copolymers, terpolymers, and the like.

The term "polymer composition" also refers to a blend of two or more polymers, and is interchangeable with the term "polymer blend".

In the present invention, the "polymer composition" is the blend of at least one aromatic polyamide and at least one aliphatic polyamide.

By definition, aromatic polyamides are polymers comprising at least one repeating unit of "type 1" having at least one CONH group in the repeating structural unit of the polymer chain and at least one aromatic group.

Although not required, such aromatic groups typically originate in a diacid monomer, and include terephthalic acid (TA), isophthalic acid (IPA), phthalic acid, dodecanedioic acid etc.

By definition, aliphatic polyamides are polymers comprising at least one repeating units of "type 2" having at least one CONH group in the polymer chain. In addition, Type 2 repeating units are characterized in that 0 mol % thereof comprises an aromatic group. Thus, the maximum content of aromatic group-containing repeating units in an aliphatic polyamide herein is 0 mol % based on 100 mol % repeating units in the polymer. Although not required, such aliphatic groups may originate in a diamine monomer, and include aliphatic diamines comprising 4 to 12 carbon atoms, such as hexamethylene diamine (HMDA), nonane diamine, 2-methyl-1, 5 pentadiamine, and 1,4-diaminobutane, etc. One useful diacid source of aliphatic units is adipic acid.

Useful examples of invention aliphatic polyamides include aliphatic nylon (e.g. PA6, PA6.6, PA6.12, PA4.6, PA11, PA12, etc.).

The polymer composition of the invention presents an excellent balance of properties such as fuel permeability, mechanical properties and welding performance:

Fuel permeability is below 10 mg·mm/(m$^2$·day) with E10 fuel, measured by gas chromatography at 40° C. (isothermal temperature). The fuel permeability has been measured after 20 weeks of soaking in E10 fuel. E10 fuel is a gasoline fuel containing 10% by weight of ethanol.

Regarding mechanical properties, tensile modulus measured at 60° C. according to ISO527 (test specimen type ISO527-1BA) at 1 mm/min is comprised between 280 and 1500 MPa.

Regarding impact resistance, tanks obtained by the composition meet regulation ECE34 (defined by the United Nations) pendulum impact test at −40° C. (i.e. no leak after 30 J impact with a pyramidal shape pendulum).

Regarding welding performance, the burst pressure of a tank obtained by welding of 2 half-shells is above 6 bars (pressure is applied inside).

Below 45% of aromatic polyamide relative to the total weight of the polymer composition, the polymer composition has unsatisfactory mechanical property. The tensile modulus at 60° C. according to ISO527 at 1 mm/min is below 280 MPa. The deformation of the tank at 60° C. is thus too high (more than 10 mm).

Below 10% of aliphatic polyamide by weight relative to the total weight of the polymer composition, the polymer composition has unsatisfactory welding performance (i.e. the burst pressure of a tank obtained by welding of 2 half-shells is below 4 bars.

Preferably, the weight ratio between the at least one aromatic polyamide and the at least one aliphatic polyamide is comprised between 1.4 and 9 and the content of the at least one aliphatic polyamide is superior or equal to 10% and inferior to 35% by weight relative to the total weight of the polymer composition and the content of the at least one aromatic polyamide is superior or equal to 45% by weight relative to the total weight of the polymer composition.

In this particular composition, other additives can be added such as temperature stabilizers, antioxidants, lubricants, carbon black, modifying agents, etc. These additives degrade fuel permeability (the permeability becomes higher).

Fibers should be avoided in order not to degrade impact resistance.

To ensure optimal fuel barrier performance, a ratio of aromatic polyamide and aliphatic polyamide of 1.4 to 9 combined to a minimum content of aromatic polyamide of 45% by weight are required.

More preferably, for the same purpose, the polymer composition of the invention comprises:

at least one first composition of aromatic polyamide in a first proportion of from 65 to 90% by weight relative to the total weight of the polymer composition, said first proportion being measured by NMR spectroscopy; and at least one second composition of aliphatic polyamide in a second proportion of from 10 to 35% by weight relative to the total weight of the polymer composition, said second proportion being measured by NMR spectroscopy.

By "composition of an aromatic polyamide", it has to be understood to be a polymer composition comprising at least one aromatic polyamide.

Of course, more than one aromatic polyamide may be used in the polymer composition.

Terephthalic acid and isophthalic acid are example of aromatic residues. Aromatic residues are characterized by the presence of an aromatic ring, typically with 6 carbons.

In a preferred embodiment, the aromatic polyamide contains at least 30 mole % of aromatic residues in the repeating structural units in the polymer chain.

Non limitative examples of aromatic polyamides useful for the invention are including polyacrylamide MXD6 (such as grade IXEF commercialized by Solvay) or polyphthalamides (such as Amodel® grades from Solvay or Zytel® from Dupont or Grivory® HT from EMS).

One class of preferred aromatic polyamides is polyphthalamides (PPA). According to the norm ASTM D5336, PPA is an aromatic polyamide in which residues of terephthalic acid or isophthalic acid or a combination of the two comprise at least 55% molar of the dicarboxylic acid portion of the repeating structural units in the polymer chain. PPA comprises more than 55 mole % of the repeating structural units formed by the polycondensation reaction between at least one phthalic acid and at least one aliphatic diamine. The aliphatic diamine can be notably hexamethylenediamine, trimethyl hexamethylene diamine, nonanediamine, 2-methyl-1,5 pentadiamine, and 1,4-diaminobutane, cycloaliphatic diamine.

Polyphthalamides are comprising for instance PA6T, PA6T/6I or PA 6T/6I/66, and mixtures thereof.

Such composition is commercially available and can comprise modifying agents.

By "modifying agents", it has to be understood to mean compounds imparting useful properties to the aromatic polyamide composition, such as impact resistance.

This term is interchangeable with the term "impact modifiers".

Such modifying agents can be anhydride modified ethylene copolymer, sold by Dupont the Nemour under the name "Fusabond". Ionomers can also be used. These are ion-containing polymers with (usually 10-15 mol %) ionic groups along the backbone chains or as pendant groups, sold by Dupont the Nemour under the name Surlyn. Another example is maleic anhydride modified linear low-density polyethylene, sold by Arkema under the name "Orevac" and "Lotader". Still another example is Random Ethylene-Acrylic Ester-Maleic Anhydride (MAH) Terpolymers sold by Arkema under the name "Lotader MAH" A further example is ethylene vinyl acetate copolymer functionalized with acrylic acid ethylene octen copolymer functionalized with maleic anhydride. Such products are sold by BIC under the name "SCONA TPEV 1110 PB" and "TSPOE 1002 CMB 1-2". Elastomer such as EPDM polymers, ABR-, BR- and SBR-graft polymers.

The modifying agent and aromatic polyamide can be mixed together in any manner, and mixing can occur before, e. g., extrusion, or the materials may be mixed in the extruder, or the materials may also be mixed during the injection of the tank shells.

In a particular embodiment, said at least one first composition of an aromatic polyamide of the invention is at least one first composition of a polyphthalamide (PPA).

Another class of aromatic polyamides is polyacrylamide or PMXDAs, i.e. aromatic polyamides comprising more than 50 mole % of recurring units formed by the polycondensation reaction between at least one aliphatic diacid (such as adipic acid) and metaxylylenediamine.

One example of aromatic polyamide based on metaxylylenediamine is PA MXD 6.

In a particular embodiment, said at least one first composition of an aromatic polyamide of the invention is at least one first composition of a PMXDA.

By "composition of aliphatic polyamide", it has to be understood to mean a composition of a polymer composition comprising at least one aliphatic polyamide.

Preferably, said at least one second composition of an aliphatic polyamide is at least one second composition of a PA6 or PA6.6.

Of course, more than one aliphatic polyamide may be used in the polymer composition.

In addition, the modifying agents described above may be used in the aliphatic polyamide composition of the invention.

In preferred embodiments, the modifying agents are present in a concentration of less than 45% by weight, relative to the total weight of the polymer composition (first and second compositions).

Above 90% by weight of the first composition of aromatic polyamide relative to the total weight of the polymer composition, the polymer composition has lower welding performance (i.e. the burst pressure of a tank obtained by welding of 2 half-shells is below 4 bars).

Above 65% by weight of the first composition of aromatic polyamide relative to the total weight of the polymer composition, the polymer composition has improved tensile modulus at 60° C. according to ISO527 at 1 mm/min. The tensile modulus obtained is superior to 500 MPa at 65% by weight of the first composition of aromatic polyamide relative to the total weight of the polymer composition. The deformation of the tank is thus reduced during ageing.

Even more preferably, the first proportion is from 75 to 80% by weight relative to the total weight of the polymer composition and the second proportion is from 20 to 25% by weight relative to the total weight of the polymer composition. In the proportion of 75-80% by weight of the first composition, the polymer composition has a tensile modulus at 60° C. according to ISO527 at 1 mm/min superior to 1000 MPa. That allows to decrease even further the deformation of the tank.

Said proportions are measured by NMR spectroscopy and more particularly by 13C NMR spectroscopy.

In a particular embodiment, the first composition further comprises a first modifying agent, and wherein the proportion of aromatic polyamide is from 60 to 100% by weight relative to the total weight of said first composition, and the proportion of first modifying agent is from 0 to 40% by weight relative to the total weight of said first composition.

In a particular embodiment, the second composition further comprises a second modifying agent, and wherein the proportion of aliphatic polyamide is from 60 to 100% by weight relative to the total weight of said second composition, and the proportion of second modifying agent is from 0 to 40% by weight relative to the total weight of said second composition.

Such agents are detected by microscopy, such as Transmission Electron Microscopy (TEM) and/or Atomic Force Microscopy (AFM).

Such agents can be detected by any other methods known by the person skilled in the art.

Preferably, the modifying agents are substantially devoid of compounds which may adversely affect the fuel permeability of the composition. By adversely affecting the fuel permeability is intended agents or compounds which may substantially increase the fuel permeability of the resulting product. The term substantially referrers here to an increase by more than 10% the fuel permeability).

With the polymer composition of the invention, the half tank shells present high mechanical properties and are particularly overpressure-resistant.

Such polymer composition is therefore suitable for fuel tank especially for fuel tank for hybrid vehicles where the tank internal pressure can reach values up to 0.5 bars.

With such polymer composition, the half tank shells present high chemical properties and are particularly suitable for fuel tank especially for fuel tank for hybrid vehicles where the tank internal pressure can reach values up to 0.5 bars.

With such polymer composition, the half tank shells present good welding performance.

Indeed, polyamides of the first composition and the second composition are usually semi-crystalline.

The term "semi-crystalline" refers to a polymer. The semi-crystalline polymer has a temperature of crystallization.

The crystallization temperature of the aromatic polyamide is advantageously lower than 320° C., preferably lower than 305° C., more preferably lower than 290° C., and still more preferably lower than 275° C.

The crystallization temperature of the aliphatic polyamide is advantageously lower than 210° C. and preferably lower than 190° C.

The polymer composition of the fuel tank of the invention comprises at least one first composition of an aromatic polyamide having a first temperature of crystallization, at least one second composition of aliphatic polyamide having a second temperature of crystallization, the second temperature of crystallization being lower than the first temperature of crystallization and the temperature of crystallization of the polymer composition being lower than the first temperature of crystallization, as measured by differential scanning calorimetry (DSC) with a DSC measurement comprising 3 steps: first heating, cooling and second heating. Heating and cooling are performed at 10° C./min, under nitrogen. The temperature range starts at −50° C. and ends at 350° C. to avoid material degradation. The amount of sample analyzed is about 10 mg. The temperature considered for crystallization is measured during the cooling step. An exothermal pic is observed during the crystallization phenomenon. As soon as the crystallization begins, the polymer cannot be welded anymore since crystalline phases start to freeze. Consequently, the temperature considered for crystallization is the onset of the crystallization pic.

Thus, the polymer composition of the invention has a lowered temperature of crystallization compared to the one of the first composition.

In other words, by lowering the temperature of crystallization of the polymer composition, the crystallization of the polymer composition during the welding process is delayed.

During the welding operation, the half tank shells are first heated by a heating tool so that the material is in molten state all along the welding path. Then, the half tank shells are taken away from the heating tool. A critical time is needed to take away the half tank shell from the heating tool. This step is called transfer. During this time, the material starts to cool down. Finally, the half tank shells are pressed together. This final step is called joining. In order to obtain a good weld, it is important that the crystallization begins after the joining operation.

It means that the quality of the weld is improved if the crystallization is delayed by more than the transfer time.

The temperature of crystallization of the polymer composition according to the invention is lowered by at least 5° C. compared to the temperature of crystallization of said at least one composition of an aromatic polyamide, as measured by differential scanning calorimetry (DSC).

That result allows to increase the transfer time by more than 10%.

By definition, welding process is a fusion bonding process between two compatible polymer compositions accomplished by raising the temperature of the joint above the melt temperature of the polymer composition at the interface, and then allowing the joint to cool down while intimate contact is maintained by the applied pressure.

Once polymer-to-polymer contact is achieved at the interface, intermolecular diffusion and entanglement is needed to complete the process and to form a good weld. Autohesion is the phenomenon describing the intermolecular diffusion and chain entanglement across a thermoplastic polymer interface, autohesion relies on chain entanglement and secondary bonds for polymer chains of similar materials.

The crystallization point of all the compositions of the invention can be measured by techniques known in the art of any suitable technique; generally, which is determined by differential scanning calorimetry measurements.

The welding process can be performed by heating mirror, laser, hot gas, IR, or any others methods known by the person skilled in the art.

Particle-free processes are preferred.

Advantageously, an accessory of the fuel tank can be made of the polymer composition of the invention comprising:

at least 45% by weight of at least one aromatic polyamide; and at least 10% by weight of at least one aliphatic polyamide relative to the total weight of the polymer composition.

Thus, such accessory can be weldable to the fuel tank according to the invention.

Such accessory can be used for protecting an active component such as a level sensor, a temperature sensor, a pressure sensor, hydrocarbon sensor, fuel pump, etc.

The accessory can be for example a housing, a nipple, a valve, a spud, a bracket or any other components.

DETAILED DESCRIPTION OF THE DRAWINGS

FIG. 1 represents the DSC spectrum of the polymer composition comprising 45% by weight of PPA and 30% by weight of PA and 24.5% by weight of modifying agent and 0.5% by weight of carbon 25 black. The DSC spectrum presents a crystallization exotherm with an onset at about 254° C. That means that the crystallization starts at 254° C. during the cooling during the DSC test.

EXPERIMENTAL PART

Preparation of the Polymer Composition

The polymer composition is preferably prepared by extrusion. The materials from the polymer composition are introduced in the hopper of the extruder thanks to a feeding device according to desired proportions. A twin screw extruder is preferred. The process is thus a melt mixing process. The materials are dried before mixing if needed. At the exit of the extruder, the material is cool down (in the air or through a water bath).

The material is then dried and finally pelletized and packaged in sealed bags. Additional drying operations can also be performed after the material has been pelletized. The pellets obtained are then used to prepare the half shells by injection molding.

Experimental Examples

The following examples are considered to be non-limiting and only representative of selected embodiments.

Mechanical Tests

The mechanical performance was tested by determining the tensile modulus according to the norm ISO 527 at 1 mm/min. ISO527-1BA test specimens are machined on injection molded test plates or tank shells. The thickness of the test specimens is 3 mm. Test specimens are conditioned at least 2 days at 23° C. and 50% relative humidity before testing. After installation on the machine, test specimens are conditioned during 15 min at the desired temperature. Stress/strain curve is recorded.

The tensile modulus results of different polymer compositions according the invention are presented in the following Table (page 16).

Fuel Permeability Tests

Fuel permeability tests were performed to study the chemical performance of different polymer compositions according to the invention.

The term "fuel" is here understood as comprising various mixtures of hydrocarbons used as fuel in internal combustion or high-compression engines. Thus, this term in particular encompasses fuel oil, diesel oil and all categories of petrol, as well as mixtures of hydrocarbons and alcohols, or the like. The fuel permeability (FP) was measured by the gas chromatography method. The fuel used is "ASTM fuel CE10" (composed of 10 vol. % ethanol and 90 vol. % of "ASTM fuel C" (50/50 wt % mixture of toluene and iso-octane)). The fuel permeability measurements were performed at 40° C. under dry conditions. The samples are conditioned with fuel during at least 10 weeks to reach a steady-state. The standard deviation in this method is between 5 and 10%. Test samples for permeability are injection molded plates with a thickness of 3 mm. These plates are mounted on a metal cell. The surface of the sample exposed to fuel is a disk of 80 mm diameter. A rubber seal is placed between the sample and the metal cell. In order to avoid hydrocarbon emissions from the seal, the permeability measure is performed with double cells.

The fuel permeability results of different polymer compositions according to the invention are presented in the following Table (page 16).

Welding Performance Tests

Differential scanning calorimetry (DSC) has been used to study the thermal properties, degree of crystallinity of different polymer compositions and more particularly to study the welding performance of different polymer compositions according to the invention.

The result of a DSC measurement using a Differential Scanning calorimeter is a curve of heat flux versus temperature. DSC is used to determine specific temperatures such as crystallization temperature (Tc).

The DSC thermograms were produced. For each analysis, approximately 10 mg of the polymer composition was placed in aluminum pan and sealed. The sample pan was placed into the DSC instrument with an empty aluminum pan as its reference. Then, different polymer composition samples were heated using a ramp program from −50 to 350° C. at 10° C./min.

Figure 1:
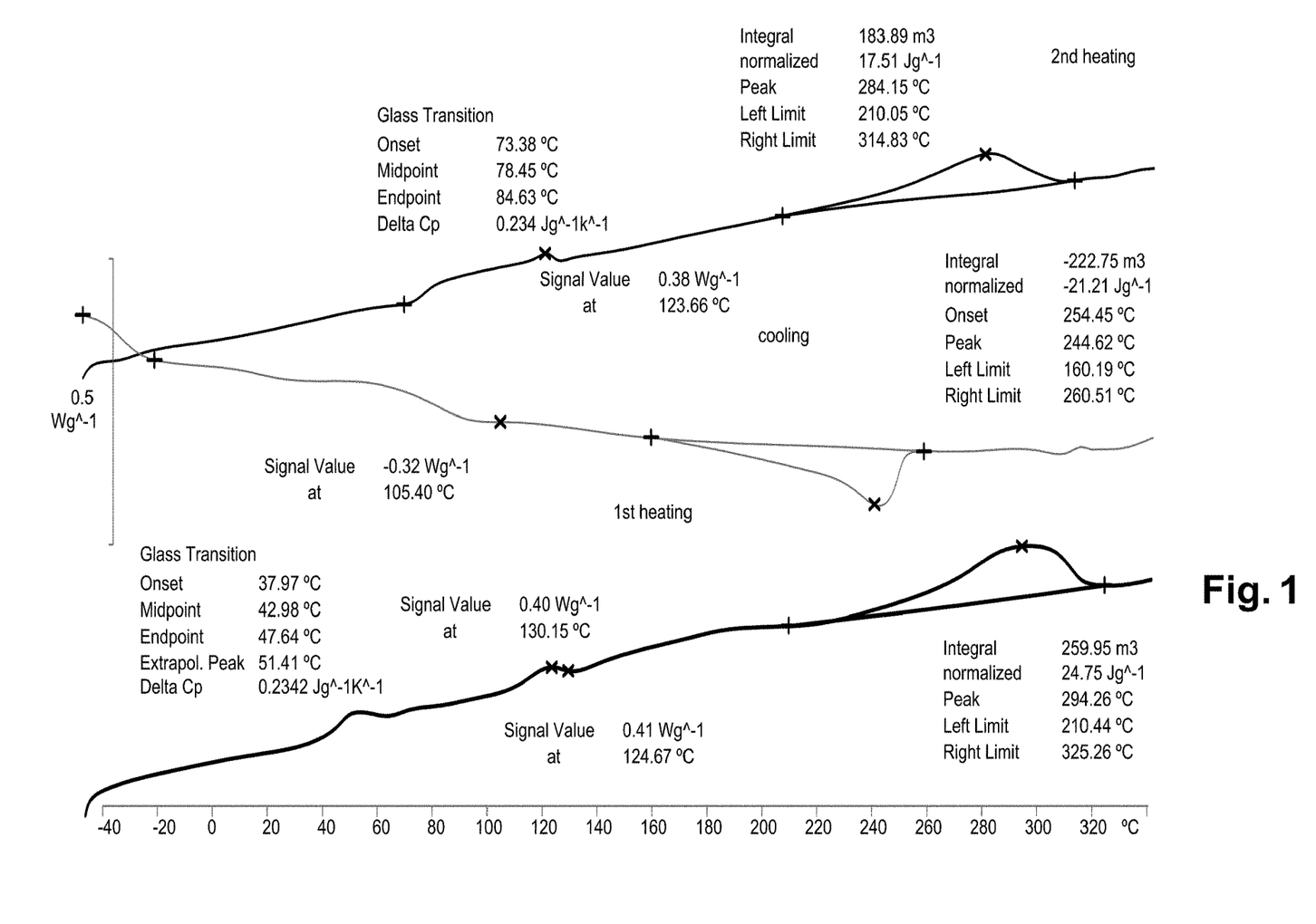
FIG. 1 shows a DSC Thermogram for the polymer composition of in the examples. Specifically.

The DSC result values are reported in the following Table.
One example of DSC Thermogram for the polymer composition is shown in FIG. 1.

| Polymer composition | 100 wt % of first composition of PPA 0% of second composition of PA6 | 80 wt % of first composition of PPA 20% of second composition of PA6 | 75 wt % of first composition of PPA 25% of second composition of PA6 | 70 wt % of first composition of PPA 30% of second composition of PA6 | 65 wt % of first composition of PPA 25% of second composition of PA6 | 45% wt of PPA 30% wt of PA 24.5% of modifying agents 0.5% carbon black | 40 wt % of first composition of PPA 60% of second composition of PA6 |
|---|---|---|---|---|---|---|---|
| Tensile Modulus TM (60° C.) MPa | 1521 | 1374 | 1200 | 600 | 500 | 280 | <280 |
| Fuel Permeability FP mg mm/(m² · day) | <10 | <10 | <10 | <10 | <10 | <10 | / |
| Crystallization temperature Tc ° C. | 267 | 259 | / | 248 | / | 254 | 223 and 157 |
| Transfer time gain s | reference | 0.32 more compared to reference | / | 0.72 more compared to reference | / | / | / |

The Table illustrates the mechanical and chemical properties of the polymer composition of the invention.

In the interval of the invention, the polymer compositions present good results in term of mechanical property. The tensile modulus at 60° C. is above 280 MPa. These results are particularly true for a polymer composition comprising 80% by weight of the first composition of PPA and 20% by weight of the second composition of PA6, these contents being relative to the total weight of the polymer composition.

Regarding to the chemical properties, the polymer compositions of the invention present good fuel permeability, inferior than 10 mg·mm/(m²·day) and present crystallization temperatures delayed compared to a composition of a neat PPA. Those have a positive impact of the transfer time for the welding operation. The transfer time for the welding operation is increased, facilitating thus the welding operation between two different parts of the fuel tank, these two parts having the polymer composition of the invention.

In regards to the mechanical and chemical properties, the polymer composition comprising a content of the first composition of PPA of 80% by weight and a content of the second composition of PA6 of 20% by weight relative to the total weight of the polymer composition is the polymer composition which best meets the technical objectives.

Another particular advantage of the polymer composition of the invention is the ability to manufacture different tanks withstanding different pressure levels; for example an unpressurized tank which comprises a polymer composition having 45% by weight of PPA and, on the contrary, a pressurized tank withstanding more than 300 mbar which comprises a polymer composition having 75% by weight of the first composition of PPA.

Characterization of the Polymer Composition

DSC Description

FIG. 1 represents the DSC spectrum of the polymer composition comprising 45% by weight of PPA and 30% by weight of PA and 24.5% by weight of modifying agent and 0.5% by weight of carbon black.

The DSC spectrum presents a crystallization exotherm with an onset at about 254° C. That means that the crystallization starts at 254° C. during the cooling during the DSC test.

NMR Description

The polymer composition according to the invention was characterized by NMR spectroscopy.

Polyamides may be produced by the reaction of a difunctional acid with a difunctional amine, or the self-condensation of either an amino acid or a lactam.

By definition, aromatic polyamides are polymers comprising at least one repeating units of "type 1" having at least one CONH group in the polymer chain and at least one aromatic group. Although not required, such aromatic groups typically originate in a diacid monomer, and include terephthalic acid (TA), isophthalic acid (IPA), phthalic acid, dodecanedioic acid etc.

The diacid and the diamine monomers form characteristic repeating structural units of the polymer chain.

By identifying these repeating units, it is possible to determine the nature of the diacid and the diamine and consequently it is possible to determine the nature of the polymer.

A convenient way to identify these repeating units is to analyze the chemical functions on each carbon of these repeating units by carbon 13 NMR.

In a first qualitative step, the chemical functions present in the mixture are identified. The chemical shifts corresponding to the different functions are available in reference tables or handbooks. The 1H NMR spectra brings complementary information, as disclosed for instance in J. Am. Chem. Soc. 1956, 78, 3043.

Thanks to carbon 13 NMR, it is possible to determine the relative position of these functions, one to the others. Indeed, the chemical shift of a given carbon, obtained by carbon 13 NMR, is influenced by the chemical functions of the next carbons of the polymer chains.

After this step, chemical functions on each adjacent carbon are known, allowing to determine the whole polymeric chain which is present. The chemical function associated to each peak is determined.

A second quantitative step is based on integration of each peak.

Figure 2A:
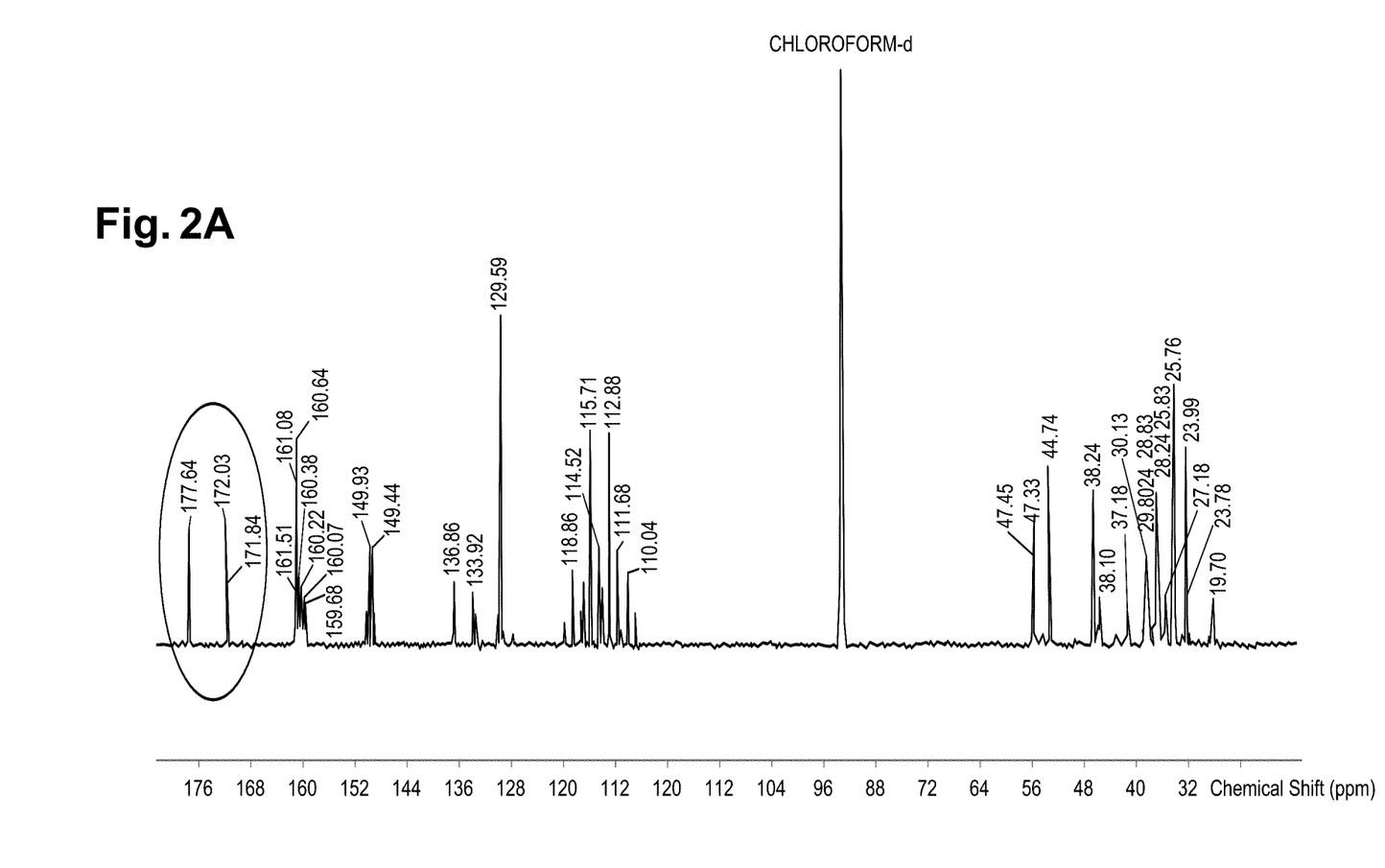
FIG. 2A is the entire $^{13}$C NMR spectrum of the polymer composition.
Figure 2B:
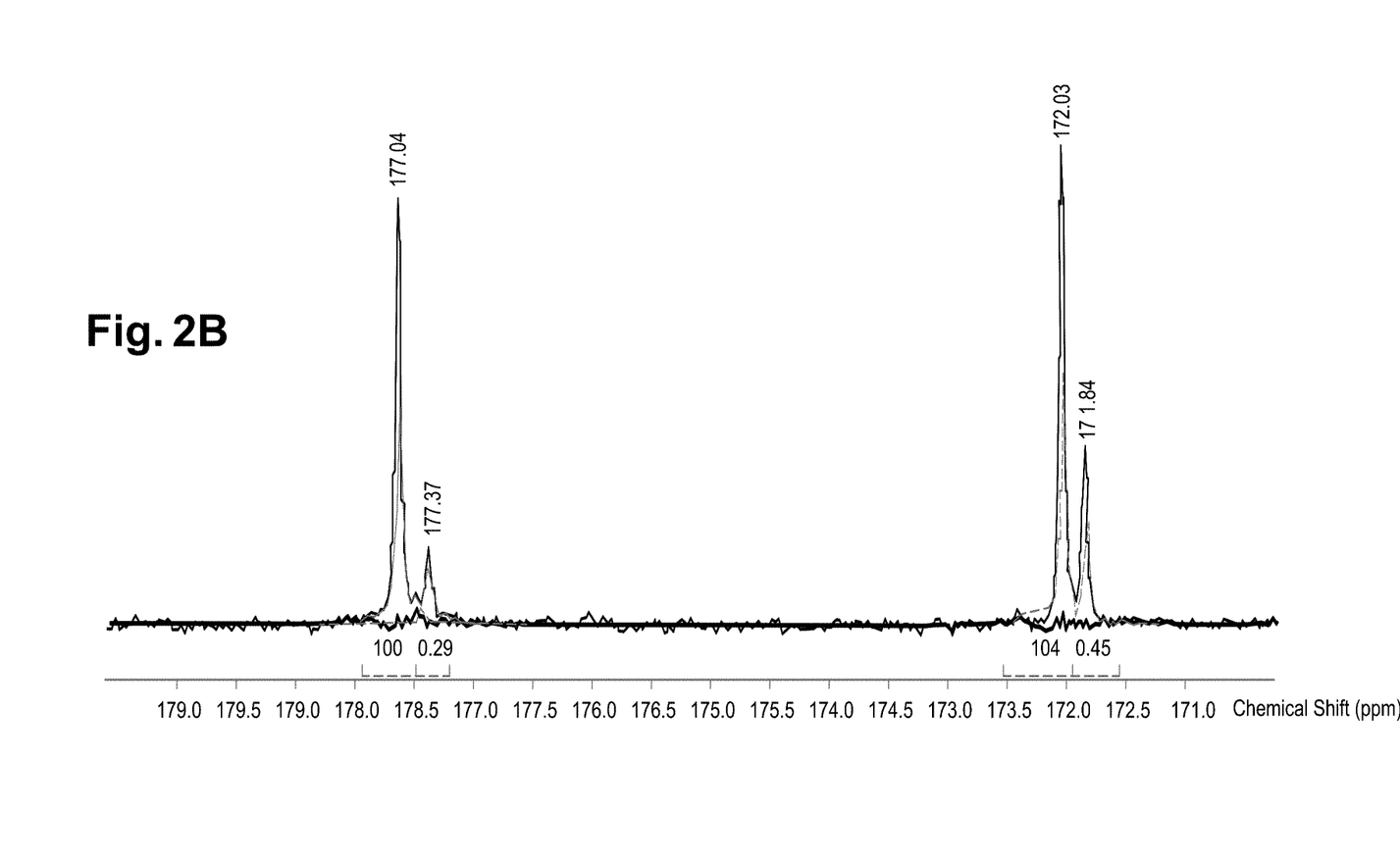
FIG. 2B is a zoomed part of the $^{13}$C NMR spectrum of the polymer composition highlighting the characteristic peaks of the polymer composition (such as peaks corresponding to carbon of IPA carbonyl, carbon of TA carbonyl, carbon of PA6 carbonyl, carbon of PA6.6 carbonyl).

FIG. 2A is the entire 13C NMR spectrum of the polymer composition. FIG. 2B is a zoomed part of the 13C NMR spectrum of the polymer composition highlighting the characteristic peaks of the polymer composition (such as peaks corresponding to carbon of IPA carbonyl, carbon of TA carbonyl, carbon of PA6 carbonyl, carbon of PA6.6 carbonyl).

The 13C NMR spectrum were acquired in a 30/70 volume mix of trifluoroacetic anhydride (C4F6O3) and deuterated chloroform (CDCl3) at room temperature and auto referenced against the solvent peak using the JEOL ECS 400 NMR spectrometer.

The chemical shifts δ are in units of part per million (ppm). With the 13C NMR spectrum and its corresponding NMR table, the identification of carbons of the expected chemical groups: IPA carbonyl, TA carbonyl, PA6 carbonyl, PA6.6 carbonyl can be performed. (IPA: isophthalic acid, TA: terephthalic acid)

The chemical group identification is reported in the following Table. The integration of these carbons is given by the spectrum.

TA, IPA and PA66 have 2 carbon (2 carbonyl functions) exhibiting the same chemical shift.

PA6 has only one associated carbon (one carbonyl function)

| Molecule | Number of carbons | Integration | Chemical shift (ppm) |
|---|---|---|---|
| IPA carbonyl | 2 | 0.45 | 171.84 |
| TA carbonyl | 2 | 1.04 | 172.03 |
| PA6 carbonyl | 1 | 1 | 177.64 |
| PA6.6 carbonyl | 2 | 0.29 | 177.37 |

Furthermore, the total of carbonyl functions is 100%.

With these results, the molar proportion of PA6, PA6.6, TA and IPA can be determined by the following equations:

$$TA + IPA + 2PA6 + PA6.6 = 100$$

$$\frac{TA}{IPA} = 2.3$$

$$\frac{TA}{PA6.6} = 3.6$$

$$\frac{PA}{PA6.6} = 6.9$$

After calculation, the following molar percentage of the different components of the polymer composition are obtained and reported in the following table:

| components | % molar |
|---|---|
| PA6 | 52.8 |
| PA6.6 | 7.6 |
| IPA | 27.5 |
| TA | 11.9 |
| Sum | 100 |

The corresponding weight percentage can be determined and are reported in the following table:

| Components | Molar mass g/mol | Mass g | Weight % |
|---|---|---|---|
| PA6 | 113 | 5967.7 | 34.3% |
| PA6.6 | 226 | 1729.7 | 9.9% |
| TA | 246 | 6778.3 | 38.9% |
| IPA | 246 | 2947.0 | 16.9% |
| Sum | | 17422.9 | |

By this analysis, the weight proportion of PPA, PA6, PA6.6, IPA, TA of the polymer composition is determined.

Method for Detecting Modifying Agents in the Polymer Composition:

Transmission Electron Microscopy (TEM)

The morphological characterization of the modifying agents in the polymer composition of the invention was performed by Transmission Electron Microscopy (TEM).

The ultra-thin layers (70 nm) for observation by Transmission Electron Microscopy were made using an ultra-microtome brand Leica Reichert-UMUC6 at room temperature from samples taken from the plates and more particularly from the core of the plates. The observations were made using a Zeiss LEO922 with an acceleration voltage of 120 kV.

In addition, a marking to the vapor of Ruthenium (RuO4) for a period of 12 minutes has been performed on the samples.

Figure 3:
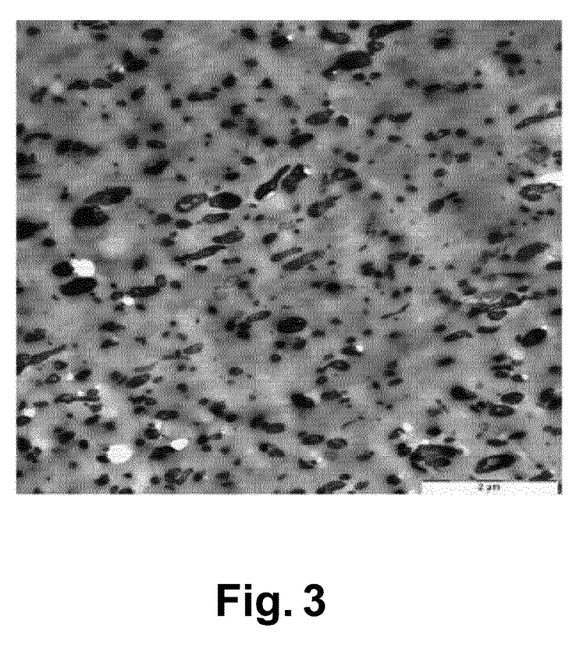
FIG. 3 illustrates the TEM image obtained for ultra-thin layers (70 nm) for observation by Transmission Electron Microscopy were made using an ultra-microtome brand Leica Reichert-UMUC6 at room temperature from samples taken from the plates and more particularly from the core of the plates. The observations were made using a Zeiss LEO922 with an acceleration voltage of 120 kV.

FIG. 3 illustrates the TEM image obtained.

Two levels of grey/black are visible in the TEM image. The black phase corresponds to an amorphous phase. That is to say that it corresponds to the modifying agents of the polymer composition.

The grey phase corresponds to the neat PPA.

The light phase (white) corresponds to PA6 (continuous phase).

Atomic Force Microscopy:

AFM measurements were performed with the Peak-Force-QNM fashion installed on a system-Dimension Icon Bruker. This mode provides the surface topography and the value of elastic modulus surface simultaneously. The AFM tips with a constant spring of ~40 N/m and a tip radius of curvature of ~15 nm were used to image the sample surface. Flat surfaces having a roughness at the nanoscale were prepared with a diamond knife and with an ultra-cryo-microtome technique. The temperature for the preparation was either to room temperature or to −100° C. with a cooling by liquid nitrogen. The cutting temperature selection optimizes the surface quality. Final surfaces prepared by microtomy have a size of 2*2 mm. The raw data were analyzed using the Nanoscope software to obtain topography images, modulus of elasticity and corresponding adhesion strength.

Figure 4A:
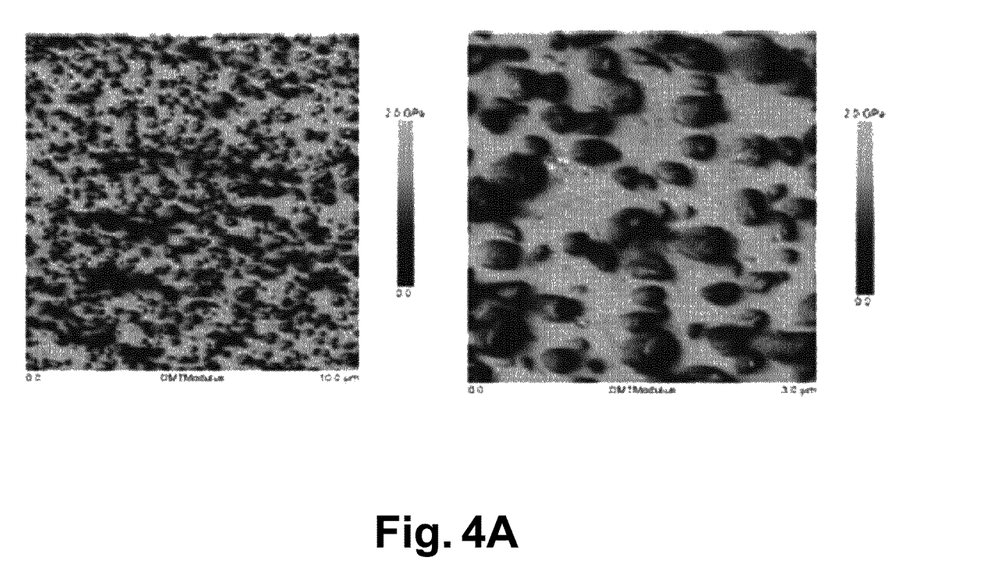
FIG. 4A illustrates an Atomic Force Microscopy image of the polymer composition of the examples.

FIG. 4A illustrates the AFM image obtained.

Two levels of grey/black are visible in the AFM image. The dark phase corresponds to an amorphous phase. That is to say that it corresponds to the modifying agents of the polymer composition.

The light phase corresponds to a continuous phase corresponding to the blend of the PPA composition and the PA6 composition of the polymer composition (light area) in which is dispersed the dark phase (e.g. modifying agents).

Figure 4B:
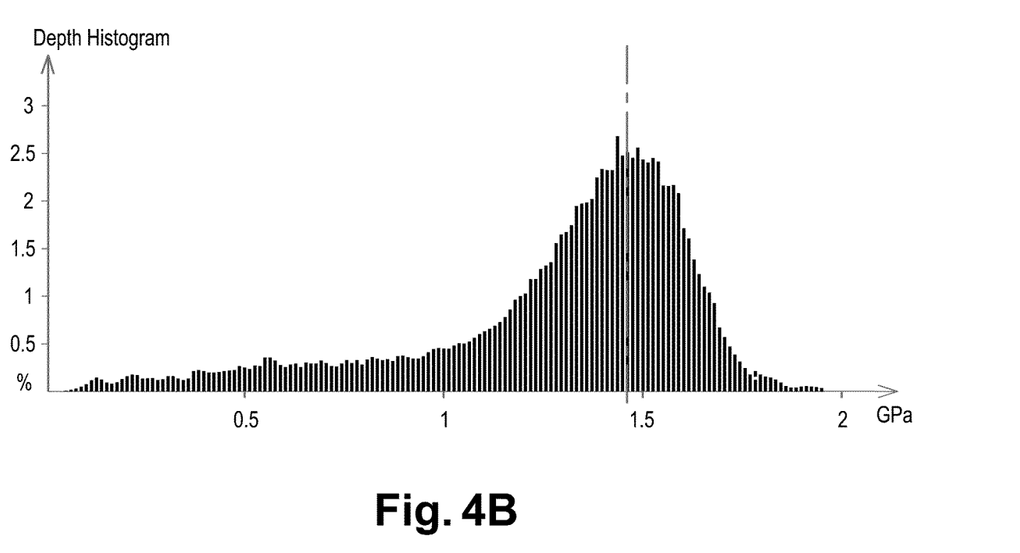
FIG. 4B shows a histogram of the distribution of elasticity modulus values of the blend PPA/PA.

The histogram of the distribution of elasticity modulus values of the blend PPA/PA is shown in FIG. 4B.

The average values of the module of the continuous phase PPA/PA and the dispersed phase is approximately equivalent to 1.5 and 0.5 GPa, respectively.

With these two detection methods (TEM, AFM), the proportion of modifying agents are determined by microscopy image analysis.

The invention claimed is:

1. A fuel tank comprising at least two shells weldable together, each of said at least two shells is made of a polymer composition comprising at least 45% by weight of at least one aromatic polyamide and at least 10% by weight of at least one aliphatic polyamide relative to the total weight of the polymer composition, the maximum content of aromatic group-containing repeating units in an aliphatic polyamide being 0 mole % based on 100 mole % repeating units in the aliphatic polyamide polymer, wherein the at least one aromatic polyamide is a polyphtalamide (PPA).

2. The fuel tank according to claim 1, wherein the weight ratio between the at least one aromatic polyamide and the at least one aliphatic polyamide is comprised between 1.4 and 9.

3. The fuel tank according to claim 1, wherein the polymer composition comprises:
   at least one first composition of aromatic polyamide in a first proportion of from 65 to 90% by weight relative to the total weight of the polymer composition, said first proportion being measured by NMR spectroscopy; and
   at least one second composition of aliphatic polyamide in a second proportion of from 10 to 35% by weight relative to the total weight of the polymer composition, said second proportion being measured by NMR spectroscopy.

4. The fuel tank according to claim 3, wherein the first proportion is from 75 to 80% by weight relative to the total weight of the polymer composition and the second proportion is from 20 to 25% by weight relative to the total weight of the polymer composition.

5. The fuel tank according to claim 3, wherein said first composition further comprises a first modifying agent, and wherein the proportion of aromatic polyamide is from 60 to 100% by weight relative to the total weight of said first composition, and the proportion of first modifying agent is from 0 to 40% by weight relative to the total weight of said first composition.

6. The fuel tank according to claim 3, wherein said second composition further comprises a second modifying agent, and wherein the proportion of aliphatic polyamide is from 60 to 100% by weight relative to the total weight of said second composition, and the proportion of second modifying agent is from 0 to 40% by weight relative to the total weight of said second composition.

7. The fuel tank according to claim 1, wherein the at least one aliphatic polyamide is a PA6 or/and PA6.6.

8. The fuel tank according to claim 1, wherein the polymer composition is substantially devoid of agents adversely affecting the fuel permeability.

9. A vehicle containing a fuel tank according to claim 1.

* * * * *